Oct. 31, 1933.　　　　C. T. RAY　　　　1,933,515
SEED PLANTER
Filed May 4, 1931
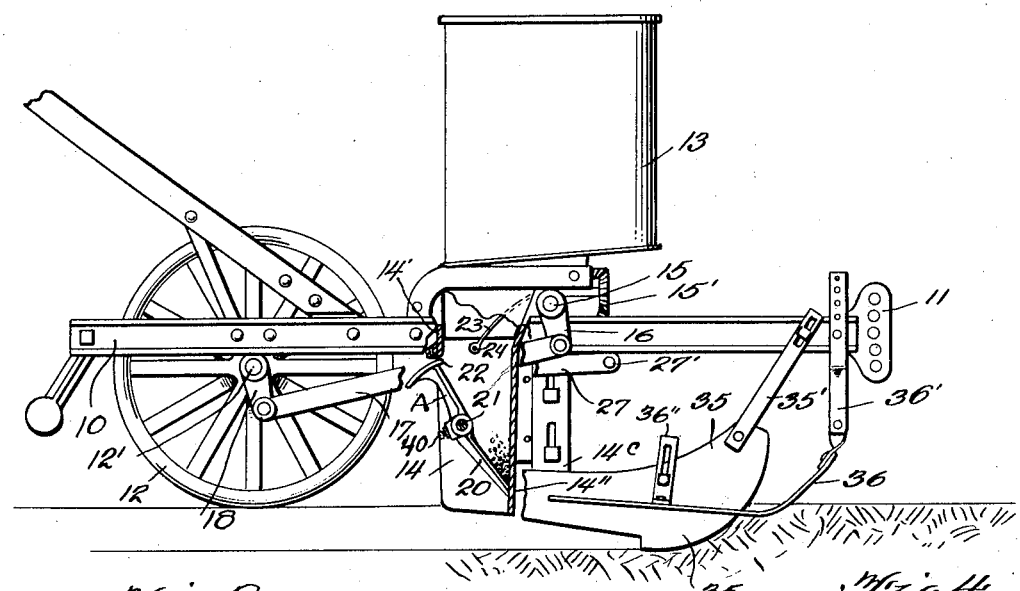
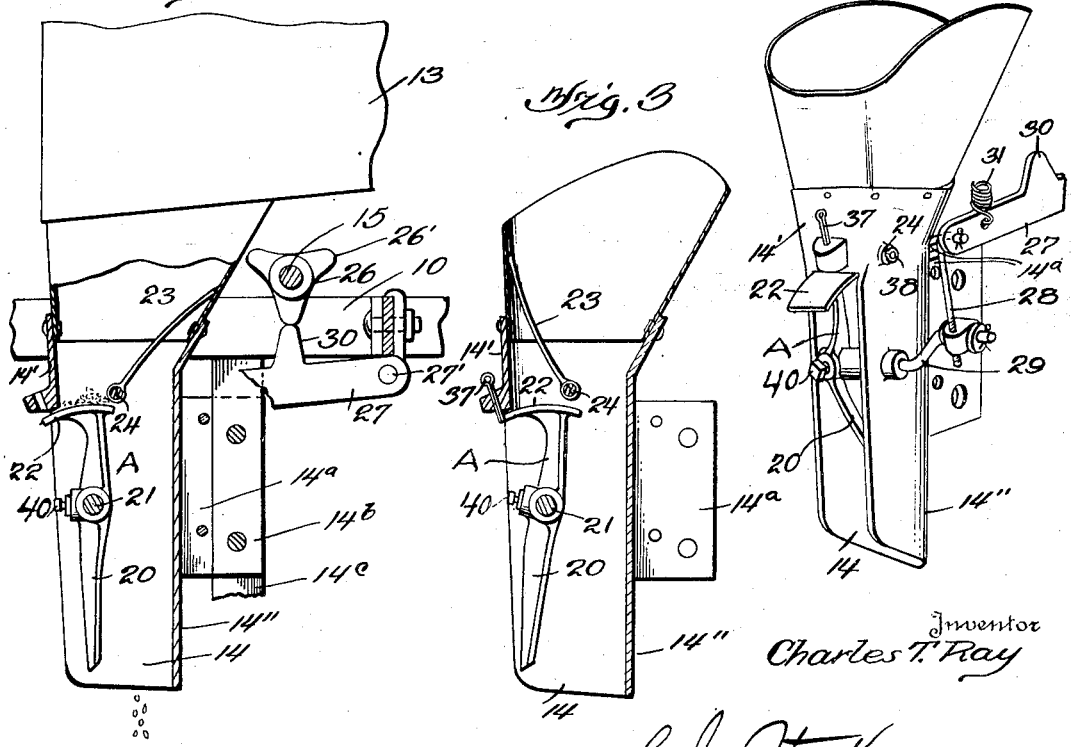
Inventor
Charles T. Ray
By C. J. Stockman
Attorney Patented Oct. 31, 1933

1,933,515

UNITED STATES PATENT OFFICE 1,933,515

SEED PLANTER

Charles T. Ray, Louisville, Ky., assignor to B. F. Avery & Sons, Louisville, Ky., a corporation of Kentucky Application May 4, 1931. Serial No. 534,926

17 Claims. (Cl. 111—51)

The term "seed planters" wherever used in the descriptive portion of this specification and in the claims without qualification as to kind or style, is intended to include all planters, both walking and riding, and listers and the like, having one or more seed hoppers and one or more seed spouts or chutes together with seed dropping mechanisms operative under control of the travel of the planter, to drop seeds singly into a seed bed or a plurality of seeds simultaneously into each of a series of hills spaced apart at regular intervals.

In an application for Letters Patent of the United States, filed by me February 27, 1929 and numbered, serially, 343,217, I have illustrated, described and claimed certain improvements in a planter adapted to discharge a plurality of seeds simultaneously at certain intervals into the seed bed or hills. The seed dropping mechanism forming part of said planter includes elements mounted in the seed hopper for effecting the discharge of the seeds from the hopper into a seed spout or chute, (hereinafter called "seed chute" for brevity's sake) and a valve mounted in the said seed chute and controlling the discharge of the seed therefrom, together with means to operate said valve automatically at intervals so related to the action of the seed dropping elements in the hopper that there will be periods during which seed will accumulate in the seed chute while the valve is closed alternating with periods during which the seed thus accumulated will be simultaneously discharged to the seed bed or hills by the opening of the valve. In the construction shown in said application the opening and closing of the valve is effected by certain connections including a tensioned arm or lever pivoted to the frame of the planter and an operating shaft which derives motion from the travel of the planter and is provided with a gear to operate the seed dropping mechanism in the hopper and with a cam to intermittently operate the tensioned arm or lever, in a predetermined timed relation with each other.

The planter illustrated in the accompanying drawing in many respects is, or may be, substantially the same as that illustrated in my aforesaid application for Letters Patent, notably, in that it is of the type in which a plurality of seeds are simultaneously dropped from the seed chute at predetermined intervals in the travel of the planter and includes a valve mounted in the seed chute, a tensioned arm or lever pivoted to the frame and having an operating connection to said valve and an operating shaft provided with a cam to engage said arm or lever and operate the same to open the valve intermittently and also provided with a gear to operate the seed dropping elements within the hopper: all as in my aforesaid application for Letters Patent. The valve, however, is of a special construction substantially different from the corresponding valve of my aforesaid application and a deflector is mounted in or adjacent to the mouth of the chute and essentially between said valve and the seed dropping mechanism within the hopper. This deflector and valve co-operate with each other in bringing about certain new and advantageous results having relation to the discharge of the seeds from the seed chute.

One of the new results, to effect which is an important purpose of the instant invention, is the entire elimination of the waste of seed and of labor incident to the scattering or dribbling of seeds into the land between the hills, and at the same time to assure that each hill will receive exactly the number of seeds predetermined therefor.

Another important purpose of the invention is to so correlate the deflector and the valve within the seed chute that they may be relatively positioned to permit the seeds to be delivered by the chute to the seed bed in the same continuous succession in which they are received from the seed dropping elements in the hopper, thereby adapting the planter for continuous drill planting.

These purposes, and others which will be apparent to those familiar with the art, are accomplished by the construction and correlation of parts illustrated in the accompanying drawing and exemplifying the preferred embodiment in respect of the seed chute, its valve and its deflector and the means for operating the valve, and also exemplifying a suitable form of planter frame and hopper to which the parts just mentioned may be applied.

In said drawing, wherein like characters of reference denote corresponding parts in the several views:

Fig. 1 is a side elevation of a planter of a well known type provided with my improved means for controlling the discharge of the seeds from the chute, said chute being shown in section and with its seed deflector and discharge valve in their relative positions during those interims between the seed discharging operations from the chute in which the seeds have been delivered to and are being held upon the lower member of the valve;

Fig. 2 is a view, partly in vertical section and partly in elevation, of a part of said planter, and shows the chute in section and with its deflector and seed discharging valve in the relative positions they occupy when the seed previously accumulated upon the valve is being discharged and other parts delivered by the seed dropping elements in the hopper are being caught by the upper member of said valve;

Fig. 3 is a detail sectional view of the chute, showing the valve held in a neutral position and against oscillatory movement and the deflector in the position it occupies when the valve is so held, to thereby permit flow of the seeds through the chute, unrestrained by the valve, to adapt the planter to be used in drilling;

Fig. 4 is a detail perspective view of the said chute and certain parts of the mechanism for operating the valve which controls the discharge of seed therefrom.

The frame of the planter selected for illustrative purposes includes two side members 10, 10 whose forward ends are in a converging relation and provided with a clevis 11 and whose rear end is provided with a ground engaging wheel 12 mounted on an axle 12'. A seed hopper 13, whose bottom is provided with any suitable seed dropping means, not shown, is mounted upon the frame in proper relation to a chute 14 into the mouth of which the seeds are dropped by said means. The operation of the seed dropping means within the hopper is under control of the travel of the planter, through the medium of appropriate mechanism, the mechanism for this purpose herein shown including a shaft 15 each of whose ends is provided with a crank 16 connected by a link 17 with a crank 18 on the end of the axle 12', and which shaft is provided with a gear 15' to intermesh with an appropriate gear which forms a part of said seed dropping means.

The seed chute 14 is provided with a valve A which includes two members 20 and 22. This valve is carried by a shaft 21 journaled in the side members of the chute, whereby the valve may oscillate about an axis provided by said shaft. It will be noticed that the shaft is arranged intermediate the ends of the valve member 20 and in such relation to the walls of the chute that the valve when in closed position will extend at a downward inclination from its upper extremity to its lower extremity and when in open position will extend substantially vertically within the chute. The member 22 of the valve is, preferably, substantially concentric with the axis of rotation of the valve member 20 and is arranged at the upper extremity of the latter, from which it projects laterally, as shown.

A seed deflector 23 is mounted in the chute between the valve member 22 and the seed dropping means in the hopper. Its lower end is secured to a pivot pin 24 extending through the side walls of the chute and its said lower end is arranged in such relation to the valve A and to the walls of the chute that when the deflector is in the position shown in Figs. 1-3, inclusive, a channel having a restricted outlet leading to the part of the chute provided with the valve A, is provided. It will be noticed that when said valve is in the position shown in Fig. 1, said channel will be opened for the delivery of the seeds to the member 20 of the valve and since said member extends entirely across the chute with its lower extremity impinging upon the wall of the latter, the seed will be retained upon said lower end until the valve is operated to shift it to the position shown in Fig. 2. In its movement to the latter position, the seeds which had been deposited on its lower member are dropped into the hill or onto the seed bed and at the same time the member 22 of the valve will bridge the space between the lower end of the deflector 23 and the wall 14' of the chute and hence close the outlet to the part of the chute containing the valve. Any seeds delivered to the chute at this time will be caught and held by the valve member 22 and will be wiped off the latter and onto the valve member 20 in the return of the valve to its former position. Hence all danger of dribbling of stray seeds through the chute and onto the land while the valve is being shifted from one position to another is positively prevented.

This shifting of the valve A is accomplished under control of the shaft 15 through the medium of a cam 26 mounted on said shaft and an arm or lever 27 pivoted at one end, 27', to an appropriate part of the planter frame and whose other end is connected by a rod 28 with the end of a crank 29 which projects from the shaft 21. Said cam 26 in the rotation of the shaft makes a wiping contact with said arm or lever and thereby depresses the latter and causes the valve member 20 to open and permit the seeds which have been deposited on the lower end thereof to be discharged. The arm or lever 27 preferably is provided with a projection 30 to be engaged by said cam and is under tension of a spring 31, whose opposite ends are connected to the planter frame and to said arm or lever, respectively. This spring operates to hold the arm or lever with its projection 30 yieldably against the cam and the correlation of these parts is such as to effect a substantially instantaneous movement of said arm or lever and hence of the valve A from or into seed discharging position. Prompt opening and closing of the valve A at proper times in the rotative movement of the cam is thus assured. This cam may have one or more high spots, according to whether the valve is to be opened only once or more than once in each rotation of the shaft 21. In the illustrated embodiment three such high spots 26' equidistantly spaced from each other are shown.

The rear wall 14' of the chute 14 has an opening throughout that portion of its length within or adjacent to which the valve A operates, and its forward wall 14" is provided with means of any suitable nature for securing it to an appropriate part of the planter. In the illustrated embodiment the said seed chute 14 is provided with a pair of spaced flanges 14a, only one of which is shown, arranged on opposite sides of a standard 14b to which it is secured by arms or plates 14c which project from the rear ends of the side members of a sword opener 35 and also secure said ends to said standard. The forward end of the sword opener is connected to the frame by a pair of arms, one of which is shown and marked 35'. The illustrated planter is also provided with an appropriate gauge 36 adjustably connected at one end to the frame of the planter by arms 36' and at its other end to the opener 35 by arms 36". It will be understood, however, that this type of opener is not essential and in fact that any appropriate opener arranged immediately in advance of the seed chute may be employed. Attention is called to the fact that said chute extends to a point in close proximity to the ground and the sword opener is so correlated with the discharge end of the said chute as to provide a shield for the latter, whereby all danger of dissipation of seed discharged from the seed chute before it reaches the seed bed is eliminated.

Reference has been made to the fact that the device forming the subject of this invention is adaptable also for planting in drills. When such planting is desired, the valve A is maintained in a position in which it is inoperative or has a neutral effect by a stop 37 which is moved into engagement with the rear of said valve, the deflector 23 also being adjusted from the position shown in Figs. 1–3, to the position shown in Fig. 4, whereby it will direct the seed into the channel forward of the valve, which channel is now open to the outlet end of the chute, as will be apparent. To facilitate this adjustment, the pivot pin 24 of the deflector is extended through the wall of the chute and provided outside the latter with a head 38 for convenience in operating it. In order that said valve will derive no motion from its operating mechanism, when adjusted to its inoperative position, it is provided with appropriate means, such as the fastening screw 40, adapted to free it from its shaft 21, so that the latter may turn freely therein in the drilling operation. Tightening of this screw will fix the valve to the shaft to thereby cause it to oscillate under power derived from the travel of the planter, as is apparent.

The arm or lever 27, it will be noticed, extends longitudinally of the planter and the rod 28 which connects it with the crank 29 projecting from the shaft 21 is adjustable to vary the distance between said arm or lever and crank in accord with the throw to be given the valve A.

It will be understood that this invention is applicable to the planting of all kinds of seeds and that its valve will be operative from the shaft 15 at a speed consistent with the number of seeds to be discharged at each rotation of said shaft. It will also be understood that the number of high spots on the cam fixed to said shaft 15 will determine the number of opening movements of the valve A in each rotation of said shaft 15. In short, provision may readily be made, according to this invention, for the kinds of seed to be planted, for the number of seeds to be delivered to the seed bed at each opening movement of the valve A and for the distance to be traversed by the planter between successive opening movements of said valve, all in accordance with the needs and desires of the user. Finally, it will be noticed, that the construction of the means constituting the present invention is simple, positive in action and adaptable to various planting conditions.

Having thus described the invention what I believe to be new and desire to secure by Letters Patent, is:—

1. A seed planter including a wheeled frame, a hopper mounted on said frame, a seed chute to receive the seeds discharged from the hopper, said chute having an opening in its rear side, an oscillatory valve and a deflector mounted in said seed chute, said valve being pivoted between its ends and having an upper member adapted to be projected from and retracted to within the chute, through said opening, in the oscillating movements of the valve, the valve also having a member adapted to extend inclinatorily within the chute with its lower end impinging upon the forward side of the latter when said upper valve member is in its projected position and to extend substantially horizontally within the chute when said upper valve member is in retracted position, and said deflector being arranged above the horizontal plane of the valve and being pivoted at its lower end in such relation to the front and rear walls of the chute and to the valve that the space between its pivoted end and the rear wall of the chute will be bridged by the upper member of the valve when the latter is in its retracted position and being adjustable to extend at a downward inclination forwardly from said rear wall or rearwardly from the forward wall of the chute, and said chute having a member adjustable to form a stop which engages the upper member of the valve and holds the valve against oscillatory movement when the deflector has been adjusted to its last mentioned position.

2. A seed planter according to claim 1, in which means deriving power from the travel of the planter are provided to oscillate the valve and said valve is mounted upon a shaft and is provided with a device operative to fix it to said shaft to be operated thereby and to free it from said shaft to permit the shaft to rotate therein, at will.

3. A seed planter according to claim 1, in which a tensioned lever extending longitudinally of the planter and pivoted at one end to the latter, a shaft upon which the valve is mounted and appropriate connections between the other end of the tensioned lever and the shaft, together with means under control of the travel of the planter and operatively related to said lever, are provided to oscillate said valve, and in which also the valve is provided with means for fastening it to and releasing it from said shaft.

4. In a seed planter, a seed chute, a deflector adjustable at will from a position in which it directs seeds into the chute at one side of the longitudinal center of the chute to a position in which it directs the seeds into the chute at the opposite side of said center, a valve including a member which opens and closes the space between said deflector and a wall of the chute and a member which opens and closes the outlet end of the chute, and means for maintaining the valve in a non-operating position.

5. In a seed planter, a seed chute, a deflector adjustable at will from a position in which it directs seeds into the chute at one side of the longitudinal center of the chute into a position in which it directs the seeds into the chute at the opposite side of said center, a valve pivoted between its ends within the chute, said valve including a member which opens and closes the space between said deflector and a wall of the chute and a member which opens and closes the outlet end of the chute, and means for maintaining the valve in a position in which an unobstructed passageway for the flow of the seeds through the chute is provided when said deflector has been adjusted to a corresponding position.

6. In a seed planter, a seed chute, an inclined deflector providing a gradually narrowing passageway at the receiving end of the chute, a valve for controlling the passage of the seeds from said passageway to the ground: said valve extending lengthwise of the chute and being pivoted between its ends and having an upper member to open and close said passageway and a member to open and close the discharge end of the chute, said members being respectively arranged on opposite sides of the pivot and operating to close said passageway and the discharge end of the chute in alternate succession, and said inclined deflector being movable at will into a position in which it directs the seeds onto the upper member of the valve when the passageway is closed by the latter and from said position into one in which it directs the seeds away from said valve member to thereby permit the seeds to pass unrestrainedly through the chute if the discharge end of the chute be open.

7. In a seed planter according to claim 6, in which means are provided to prevent closure of the discharge end of the chute when the deflector is in the position it occupies when the discharge of the seed from the chute is not to be restrained by the valve.

8. In a seed planter, a hopper, means under control of the travel of the planter for controlling the discharge of seed from the hopper, a chute to receive the seeds discharged from the hopper, an inclined deflector arranged in the path of the seeds flowing from the hopper to the chute, said deflector being pivoted at its lower end and providing a gradually narrowing passageway at the inlet end of the chute, a valve pivoted between its ends in the chute and arranged below the deflector, said valve including a member to open and close the discharge end of the chute, and extending inclinatorily across the chute when in the position in which it opens said passageway and closes the discharge end of the chute and approximately vertically within the chute when in the position in which the passageway at the inlet end of the chute is closed, means including an element adjustable into and out of a restraining relationship with said valve, for holding it in the latter position, said inclined deflector being adjustable at will to one side or the other side of the inlet end of the chute, and means under control of the travel of the planter for imparting oscillatory movement to said valve when the latter is free for such movement.

9. A seed planter according to claim 8 in which the pivot for the oscillatory valve is provided by a shaft and means are provided for securing the valve to said shaft when the valve is to be oscillated and for releasing it from said shaft when the valve is to be held against oscillatory movement.

10. In a seed planter, a wheeled frame, a hopper, a seed chute arranged to receive seeds discharged from the hopper, a valve mounted in the chute and controlling the inlet of seed thereto and the outlet of seed therefrom, an oscillatory shaft carrying said valve, said shaft having a crank arm at one of its ends, a valve-operating lever extending longitudinally of the frame and pivoted at one end thereto, a spring for tensioning said lever, means connecting the end of the lever opposite the pivot with said crank arm and means under control of the travel of the planter and serving to control the discharge of seeds from the hopper and also to control the pivotal movements of said lever.

11. A seed planter according to claim 10 in which the connection between the non-pivoted end of the valve-operating lever and the crank arm consists of a rod one of whose ends is pivoted to said lever and the other of whose ends is adjustably connected to the crank arm.

12. A seed planter according to claim 10 in which the means for controlling the discharge of seeds from the hopper and also for controlling the pivotal movements of the valve-operating lever includes a shaft which derives power from the travel of the planter and is provided with means for operating the seed dropping mechanism and said lever.

13. A seed planter according to claim 10 in which the means for controlling the discharge of seeds from the hopper and also for controlling the pivotal movements of the valve operating lever includes a shaft which derives power from the travel of the planter and operating connections between said shaft and the seed dropping mechanism and lever, the connection to the lever including a cam mounted on said shaft and provided with a plurality of high spots and said lever having a projection to be engaged by said high spots.

14. A seed planter including a wheeled frame, a seed hopper, means operated by power derived from the travel of the planter for controlling discharge of seed from said hopper, a seed chute arranged to receive seed from the hopper, a valve arranged in the seed chute and operative to open and close the discharge end of said chute, a pivotal pin or shaft connected to said valve between the ends of the latter, a tensioned valve-operating lever pivoted at one end to said frame, a connection between the other end of said lever and the valve pin or shaft through which the valve is oscillated from pivotal movements of the lever, and an inclined deflector arranged in the path of the seeds between the hopper and the valve and forming a gradually narrowing passageway leading to the upper end of the valve, said upper end of the valve having a member which closes said passageway when the valve is in the position in which it has opened the outlet end of the chute.

15. A seed planter including a fixed seed chute, a pivoted deflector which gradually narrows the passageway to the inlet end of said chute and a unitary valve oscillatorily mounted in said chute and having an upper member to control said passageway and a lower member to control the discharge of seed from the chute.

16. A seed planter comprising a fixed seed chute having an inlet opening and an outlet opening, for the seeds, and a valve arranged lengthwise of the chute and pivoted between its ends within the same, said valve having unitary members at its opposite ends to close said inlet and outlet openings in alternate succession and being arranged to extend inclinatorily across the chute when in the position in which it closes the outlet opening and opens the inlet opening and to extend substantially vertically within the chute when in the position in which it closes the inlet opening and opens the outlet opening.

17. A seed planter comprising a fixed seed chute having an inlet opening and an outlet opening, for the seeds, and a valve arranged lengthwise of the chute and pivoted between its ends within the same, said valve having unitary upper and lower members, respectively to open and close said inlet opening and to open and close said outlet opening and being arranged to extend inclinatorily across the chute when in one of its operative positions and vertically within the chute when in its other operative position, and said chute having, at one side of its inlet opening and adjacent the same, a member positioned to wipe the seeds from the upper valve member in movement of the latter to its open position.

CHARLES T. RAY.